US009156631B2

(12) United States Patent
Stevenson et al.

(10) Patent No.: US 9,156,631 B2
(45) Date of Patent: Oct. 13, 2015

(54) MULTI-STAGE SOLIDS FEEDER SYSTEM AND METHOD

(71) Applicant: General Electric Company, Schenectady, NY (US)

(72) Inventors: John Saunders Stevenson, Anaheim, CA (US); Anthony Holmes Furman, Scotia, NY (US); Derek Leslie Aldred, Granada Hills, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/705,149

(22) Filed: Dec. 4, 2012

(65) Prior Publication Data
US 2014/0150873 A1 Jun. 5, 2014

(51) Int. Cl.
| | |
|---|---|
| *B65G 53/58* | (2006.01) |
| *B65G 53/66* | (2006.01) |
| *C10J 3/50* | (2006.01) |
| *F23K 3/20* | (2006.01) |
| *C10J 3/30* | (2006.01) |
| *C10J 3/34* | (2006.01) |
| *C10J 3/52* | (2006.01) |
| *C10J 3/72* | (2006.01) |
| *F23K 3/00* | (2006.01) |

(52) U.S. Cl.
CPC . *B65G 53/66* (2013.01); *C10J 3/30* (2013.01); *C10J 3/34* (2013.01); *C10J 3/50* (2013.01); *C10J 3/52* (2013.01); *C10J 3/723* (2013.01); *F23K 3/00* (2013.01); *F23K 3/20* (2013.01); *Y10T 137/0318* (2015.04); *Y10T 137/85978* (2015.04)

(58) Field of Classification Search
USPC ........................ 406/96, 99; 198/642
See application file for complete search history.

(56) References Cited

U.S. PATENT DOCUMENTS

| | | | | |
|---|---|---|---|---|
| 3,841,465 | A | * | 10/1974 | Miller et al. ................... 241/247 |
| 3,882,946 | A | | 5/1975 | Ioannesian et al. |
| 3,944,380 | A | | 3/1976 | Kampe |
| 4,106,553 | A | | 8/1978 | Nakamura et al. |
| 4,204,955 | A | | 5/1980 | Armstrong |
| 4,236,868 | A | | 12/1980 | Linhardt |
| 4,292,991 | A | | 10/1981 | Wing |
| 4,472,171 | A | | 9/1984 | Broderick |

(Continued)

FOREIGN PATENT DOCUMENTS

| | | |
|---|---|---|
| EP | 0256186 | 2/1988 |
| EP | 0343620 | 11/1989 |

(Continued)

OTHER PUBLICATIONS

U.S. Appl. No. 13/705,154, filed Dec. 4, 2012, Thomas Frederick Leininger.

(Continued)

*Primary Examiner* — William R Harp
(74) *Attorney, Agent, or Firm* — Fletcher Yoder P.C.

(57) ABSTRACT

A system includes a multi-stage solids feeder. The multi-stage solids feeder includes a first solids feeder having a first inlet and a first outlet, a second solids feeder having a second inlet and a second outlet, and a conduit disposed between the first outlet and the second inlet. The second solids feeder is disposed adjacent to the first solids feeder, and the conduit routes a solids flow from the first solids feeder to the second solids feeder.

31 Claims, 3 Drawing Sheets

(56) References Cited

U.S. PATENT DOCUMENTS

| | | | |
|---|---|---|---|
| 4,516,674 A | 5/1985 | Firth et al. | |
| 4,666,464 A | 5/1987 | Najjar et al. | |
| 4,668,130 A | 5/1987 | Sharp | |
| 4,828,581 A | 5/1989 | Feldmann et al. | |
| 5,050,375 A | 9/1991 | Dickinson | |
| 5,051,041 A | 9/1991 | Firth et al. | |
| 5,102,237 A | 4/1992 | Ide | |
| 5,223,144 A | 6/1993 | Woyciesjes et al. | |
| 5,223,199 A | 6/1993 | Ponzielli | |
| 5,355,993 A | 10/1994 | Hay et al. | |
| 5,356,280 A | 10/1994 | Ponzielli | |
| 5,381,886 A * | 1/1995 | Hay | 198/642 |
| 5,402,876 A * | 4/1995 | Hay | 198/638 |
| 5,459,674 A | 10/1995 | Ide | |
| 5,485,909 A | 1/1996 | Hay et al. | |
| 5,497,872 A | 3/1996 | Pennino et al. | |
| 5,551,553 A | 9/1996 | Hay et al. | |
| 5,657,704 A * | 8/1997 | Schueler | 110/106 |
| 5,753,075 A * | 5/1998 | Stromberg et al. | 162/52 |
| 5,797,332 A | 8/1998 | Keller et al. | |
| 6,213,289 B1 | 4/2001 | Hay et al. | |
| 6,640,696 B2 | 11/2003 | Shinobudani et al. | |
| 6,706,199 B2 | 3/2004 | Winter et al. | |
| 7,374,734 B2 | 5/2008 | Grossman et al. | |
| 7,731,783 B2 | 6/2010 | Sprouse et al. | |
| 8,434,641 B2 | 5/2013 | Coughlin et al. | |
| 8,951,314 B2 | 2/2015 | Leininger et al. | |
| 8,992,641 B2 | 3/2015 | Leininger et al. | |
| 2001/0032780 A1 | 10/2001 | Winter et al. | |
| 2004/0107700 A1 | 6/2004 | McClanahan et al. | |
| 2008/0145156 A1* | 6/2008 | Livingood et al. | 406/14 |
| 2009/0107046 A1 | 4/2009 | Leininger et al. | |
| 2009/0178338 A1 | 7/2009 | Leininger et al. | |
| 2009/0217666 A1 | 9/2009 | Farkaly | |
| 2010/0242354 A1 | 9/2010 | Perkins et al. | |
| 2011/0072723 A1 | 3/2011 | Liu et al. | |
| 2011/0251440 A1 | 10/2011 | Huegle et al. | |
| 2012/0067047 A1 | 3/2012 | Peterson et al. | |
| 2013/0019530 A1 | 1/2013 | Favilli et al. | |
| 2013/0126002 A1 | 5/2013 | Bathurst | |
| 2013/0327028 A1 | 12/2013 | Steele et al. | |

FOREIGN PATENT DOCUMENTS

| | | |
|---|---|---|
| EP | 0418442 | 3/1991 |
| EP | 0646746 | 4/1995 |
| FR | 2811380 | 1/2002 |
| GB | 1457839 | 12/1976 |
| RU | 2376493 | 12/2009 |
| RU | 2421612 | 6/2011 |
| WO | 96/24810 | 8/1996 |
| WO | 9825027 | 6/1998 |
| WO | 9943954 | 9/1999 |
| WO | 0053924 | 9/2000 |
| WO | 0202935 | 1/2002 |
| WO | 03067082 | 8/2003 |
| WO | W02011121423 | 10/2011 |

OTHER PUBLICATIONS

U.S. Appl. No. 13/705,161, filed Dec. 4, 2012, John Saunders Stevenson.

Stamet Inc., Continuous Mechanically Controlled Solids Ash Metering from High to Low Gas Pressure, SBIR/STTR, http://www.sbir.gov/sbirsearch/detail/316954, 1997.

Perry, Robert H., Process Machinery Drives: Expansion Turbines, Perry's Chemical Engineers' Handbook, Sixth Edition, 1984, pp. 24-32 thru 24-37.

U;.S. Appl. No. 14/103,714, filed Dec. 13, 2013, Hsien-Chin Williams Yen.

* cited by examiner

MULTI-STAGE SOLIDS FEEDER SYSTEM AND METHOD

BACKGROUND OF THE INVENTION

The subject matter disclosed herein relates to systems and methods for feeding solids between upstream and downstream systems.

Solids feeders are used in a variety of industries to transport a solid material. Unfortunately, existing solids feeders generally do not adequately isolate upstream and downstream systems. For example, existing solids feeders are generally ineffective at separating upstream and downstream atmospheres, which may be at different pressures, compositions, and so forth. Furthermore, separation of upstream and downstream atmospheres may be difficult with inconsistent material supply by the solids feeder, which may be particularly susceptible to variation in flow rates due to conditions in the upstream or downstream systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a multi-stage solids feeder. The multi-stage solids feeder includes a first solids feeder having a first inlet and a first outlet, a second solids feeder having a second inlet and a second outlet, and a conduit disposed between the first outlet and the second inlet. The second solids feeder is disposed adjacent to the first solids feeder, and the conduit routes a solids flow from the first solids feeder to the second solids feeder.

In a second embodiment, a system includes a multi-stage solids feeder, which includes a first solids feeder and a second solids feeder. The first solids feeder includes a first rotary mechanism disposed in a first chamber between a first inlet and a first outlet. The second solids feeder includes a second rotary mechanism disposed in a second chamber between a second inlet and a second outlet. The first and second solids feeders are disposed adjacent one another, the first outlet is coupled to the second inlet, and the multi-stage solids feeder is configured to substantially block gas flow while enabling a solids flow In a third embodiment, a method includes feeding a solids flow through a first solids feeder from a first inlet, along a first rotary mechanism within a first chamber, and out through a first outlet. The method also includes feeding the solids flow from the first outlet through a second solids feeder from a second inlet, along a second rotary mechanism within a second chamber, and out through a second outlet. The first and second solids feeders are disposed adjacent one another as a multi-stage feeder. In addition, the method includes creating at least one dynamic plug of the solids flow in the multi-stage feeder to substantially block gas flow while enabling the solids flow through the multi-stage feeder.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are directed to a multi-stage solids feeder used for depressurizing or metering a solids flow between systems operating at different atmospheric conditions (e.g., different pressures, gas compositions, etc.). The multi-stage solids feeder includes a first solids feeder and a second solids feeder configured to feed the solids flow from an upstream system to a downstream system. The multi-stage solids feeder creates one or more dynamic plugs of the solids flow to substantially block gas flow, while maintaining the solids flow through the multi-stage solids feeder. The dynamic plugs may be formed in the entrance or exit of one or both of the solids feeders by the lockup of solids within one or both feeders (e.g., locking up while moving), which may be positive displacement pumps. The first and second solids feeders may be disposed adjacent to one another and coupled together via a conduit. The multi-stage solids feeder may include a controller for controlling a first and second solid feed rate of the first solids feeder and the second solids feeder to maintain the one or more dynamic plugs formed by the solids flow through the multi-stage solids feeder.

Figure 1:
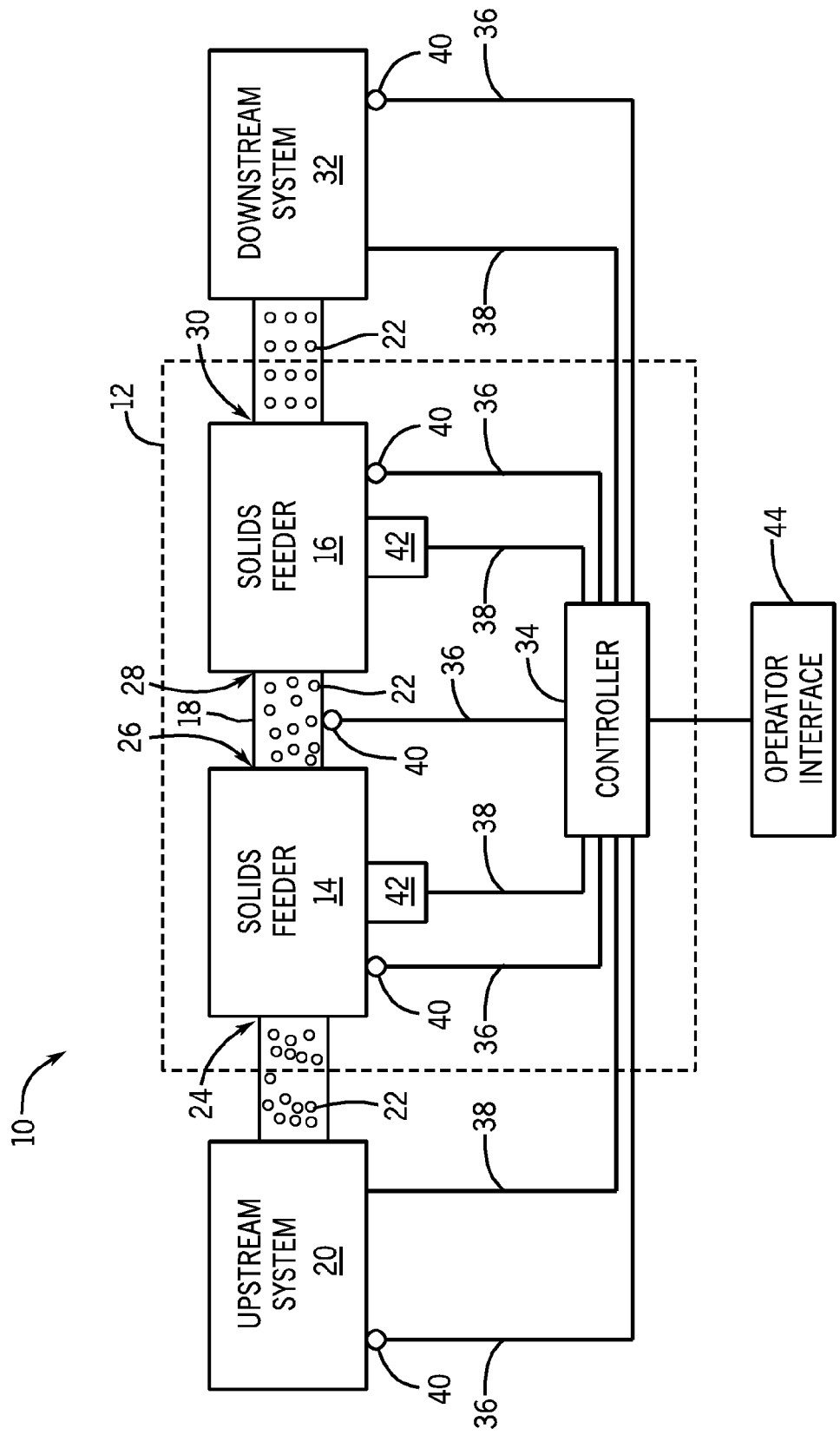
FIG. 1 is a block diagram of an embodiment of a system having a multi-stage solids feeder.

Turning now to the drawings, FIG. 1 illustrates a block diagram of an embodiment of a system 10 having a multi-stage solids feeder 12. The illustrated multi-stage solids feeder 12 includes, among other things, a first solids feeder 14, a second solids feeder 16, and a conduit 18. The first and second solids feeders 14 and 16 are disposed adjacent to each other and coupled via the conduit 18. Although the illustrated embodiment includes only the first and second solids feeders 14 and 16, other embodiments of the multi-stage solids feeder 12 may include a greater number of solids feeders (e.g., 3, 4, 5, 6, 7, 8, 9, 10, or more) coupled in series with conduits between adjacent inlets and outlets.

The first solids feeder 14 is coupled to an upstream system 20 (e.g., gasifier). As described herein, the term upstream may be a direction towards the source of a solids flow 22 (e.g., a low of solid particulate), while downstream may be in a direction of the solids flow 22 passing through the system 10. The first solids feeder 14 is configured to receive the solids flow 22 at a first inlet 24. The solids flow 22 may have various compositions including, but not limited to, fuels (e.g., coal), slag mixtures, dry char, catalysts, plastics, chemicals, minerals, pharmaceuticals, and/or food products. The first solids feeder 14 conveys the solids flow 22 from the first inlet 24 to a first outlet 26 coupled to the conduit 18. The conduit 18 routes the solids flow 22 from the first solids feeder 14 to a second inlet 28 of the second solids feeder 16. Some embodiments may include the first and second solids feeders 14 and 16 without the conduit 18 connecting the first outlet 26 to the second inlet 28. In such embodiments, the first outlet 26 of the first solids feeder 14 is also the second inlet 28 of the second solids feeder 16, and the solids flow 22 is fed from the first solids feeder 14 directly into the second solids feeder 16.

The second solids feeder 16 directs the feedstock through a second outlet 30 of the second solids feeder 16 to a downstream system 32. In some embodiments, the solids flow 22 is a solid fuel flow (e.g., particulate coal) directed from the upstream system 20 to the downstream system 32. In other embodiments, however, the system 10 may be a gasification system, in which the solids flow 22 conveyed by the first and second solids feeders 14 and 16 is a slag mixture (e.g., slag and water) output from a gasifier, as the upstream system 20. As discussed in detail below, the multi-stage solids feeder 12 may allow the formation of at least one dynamic plug of the solids flow 22 in order to substantially block gas flow while enabling the solids flow 22 between the upstream system 20 and the downstream system 32. As a result, the multi-stage solids feeder 12 may convey the solids flow 22 from the upstream system 20 at a first atmosphere to the downstream system 32 at a second atmosphere, wherein the first and second atmospheres may have different pressures, different gas compositions, and so forth. This may be desirable for pressure letdown applications, pressurizing applications, or for feeding the solids flow 22 at a desired flow rate between two incompatible atmospheres.

The multi-stage solids feeder 12 may include a controller 34 configured to monitor and control the operation of the entire system 10, or components of the system 10, through signal lines 36 and control lines 38. In some embodiments, one or more sensors 40 may transmit feedback from components of the system 10 to the controller 34 through signal lines 36. The sensors 40 may detect or measure a variety of system and solids flow properties. The sensors 40 may include but are not limited to flow sensors, pressure sensors, position sensors, torque sensors, temperature sensors, power sensors, speed sensors, or combinations thereof. For example, the sensors 40 of the first and second solids feeders 14 and 16 may measure the respective first and second solid feed rates, and the sensors 40 of the upstream system 20, the downstream system 32, and the conduit 18 may measure pressure. In particular, the sensor 40 of the upstream system 20 may measure a first pressure upstream of the multi-stage solids feeder 12, the sensor 40 of the conduit 18 may measure a second pressure between the first and second solids feeders 14 and 16, and the sensor 40 of the downstream system 32 may measure a third pressure downstream of the multi-stage solids feeder 12.

The controller 34 may control the operation of the components of the system 10 by controlling drive motors 42. Drive motors 42 may drive or actuate the components according to control signals sent via the control lines 38. In an exemplary embodiment, each drive motor 42 for the first and second solids feeders 14 and 16 may be an electric or hydraulic motor that drives a positive displacement pump. In some embodiments, the first and second solids feeders 14 and 16 may have a common drive motor 42. The controller 34 may control the operation of the first and second feeders 14 and 16 by adjusting the speed and/or torque of the one or more drive motors 42. The controller 34 may control components of the system 10 based on sensor feedback from the one or more sensors 40. For example, the controller 34 may decrease the first feed rate of the first solids feeder 14 when the rate of the solids flow 22 entering the first inlet 24 decreases in order to maintain a dynamic plug of the solids flow 22 in the first inlet 24, thereby substantially blocking gas flow between the upstream system 20 and the first solids feeder 14. Simultaneously, the controller 34 may adjust the second feed rate of the second solids feeder 16 in the same manner, in order to maintain a dynamic plug of the solids flow 22 entering the second inlet 28 of the second solids feeder 16. In general, the first and second solids feeders 14 and 16 are maintained at the same solid feed rate by the controller 34. Any desired changes in the feed rates, however, may be sequenced so that a dynamic plug is maintained between the solids feeders 14 and 16. That is, the first feed rate of the first solids feeder 14 may be increased a desired number of seconds before the second feed rate of the second solids feeder 16 is increased so that an undesirable amount of gas does not leak from the first solids feeder 14 into the second solids feeder 16. As the solids flow 22 passes through the conduit 18 between the first and second solids feeders 14 and 16, any high pressure gas that leaks through the first solids feeder 14 into the conduit 18 may be blocked by the dynamic plug of the solids flow 22 formed upstream of the second solids feeder 16. The first and second solids feeders 14 and 16, the conduit 18, the controller 34, the sensors 40, and the drive motors 42 may all be part of the multi-stage solids feeder 12.

The controller 34 may be coupled to an operator interface 44 configured to receive operator input. Through the operator interface 44, an operator may configure the controller 34 to control how the multi-stage solids feeder 12 conveys the solids flow 22 to the downstream system 32. Operator input received through the operator interface 44 may define acceptable variations in the feed rate to the downstream system 32, maximum feed rates or operating speeds, minimum feed rates or operating speeds, pressure parameters, or combinations thereof. For example, the operator may configure the multi-stage solids feeder 12 to convey the solids flow 22 to the downstream system 32 within approximately 1%, 5% or 10% of a desired feed rate. In some embodiments, the operator interface 44 may enable direct control of the system 10 by the operator. Inputs received through the operator interface 44 may direct the controller 34 to adjust the solid feed rates of the first and second solids feeders 14 and 16 due to a scheduled interruption (e.g., transition) in the solids flow 22 supplied to the first solids feeder 14 by the upstream system 20. This may allow the system 10 to maintain one or more dynamic plugs of the solids flow 22 through the multi-stage solids feeder 12. The operator interface 44 may also display information (e.g., sensor feedback) regarding the operation of the system 10 and/or the multi-stage solids feeder 12.

Some embodiments of the system 10 include a gasification system. Gasification technology can convert hydrocarbon feedstocks, such as coal, biomass, and other carbonaceous feed sources, into a gaseous mixture of carbon monoxide (CO) and hydrogen ($H_2$), i.e., syngas, by reaction with oxygen and steam in a gasifier. These gases may be processed and utilized as fuel, as a source of starting materials for more complex chemicals, for the production of substitute natural gas, or a combination thereof. In some embodiments, the upstream system 20 may be a gasifier that supplies the solids flow 22 (e.g., dry char or slag mixture) to the first solids feeder 14. The upstream system 20 may condition the solids flow 22 for input into the multi-stage solids feeder 12 and the downstream system 32. To allow this conditioning, the upstream and downstream systems 20 and 32 may be controlled by the controller 34. As described in detail below, the first and second solids feeders 14 and 16 may be positive displacement pumps. The second solids feeder 16 conveys the solids flow 22 to the downstream system 32, which may include a slag handling unit, a gas turbine, a generator, a reactor, a combustor, a boiler, a furnace, and so forth.

Presently contemplated embodiments of the multi-stage solids feeder 12 may feed the solids flow 22 from the upstream system 20 operating at a first atmosphere to the downstream system 32 operating at a second atmosphere. More specifically, the upstream and downstream systems 20 and 32 may be operating at different pressures and/or gas compositions. For example, the upstream system 20 may be a gasifier supplying the solids flow 22 (e.g., dry char or slag mixture) to the multi-stage solids feeder 12 at a relatively high pressure. The downstream system 32 may operate at lower pressures than at least the first solids feeder 14 and the upstream system 20. In other embodiments, the multi-stage solids feeder 12 may feed the solids flow 22 at a relatively uniform flow rate between two incompatible atmospheres. It may be undesirable for the upstream and downstream atmospheres to mix, or for a relatively higher pressure gas to flow through the multi-stage solids feeder 12. Therefore, the multi-stage solids feeder 12 may be configured to substantially block gas flow while enabling the solids flow 22 to pass between the upstream and downstream systems 20 and 32. In order to accomplish this, the multi-stage solids feeder 12 may maintain at least one dynamic plug of the solids flow 22 to block gas flow, as described in detail below. Dynamic plugs may be formed as a result of lockup of the solids flow 22 moving through the multi-stage solids feeder 12. The pressure of the solids lockup may be high enough to form a pressure seal that substantially reduces, and in some cases completely prevents, the passage of gas through the dynamic plug. The multi-stage solids feeder may include one or more buffer gas supplies (not shown) to introduce an inert buffer gas to certain locations in the multi-stage solids feeder 12. The buffer gas may substantially block gases from leaking through the dynamic plug of solids flowing through the multi-stage solids feeder 12. The multiple dynamic plugs in the multi-stage solids feeder 12 may decrease the amount of high pressure gas from the upstream system 20 that flows to the second solids feeder 16 and/or the downstream system 32. Similarly, the dynamic plugs may decrease the amount of gas flowing from the downstream system 32 to the first solids feeder 14 and/or the upstream system 20. The controller 34 may adjust the first or second solid feed rates of the first and second solids feeders 14 and 16 to maintain the desired dynamic plugs in the multi-stage solids feeder 12.

Figure 2:
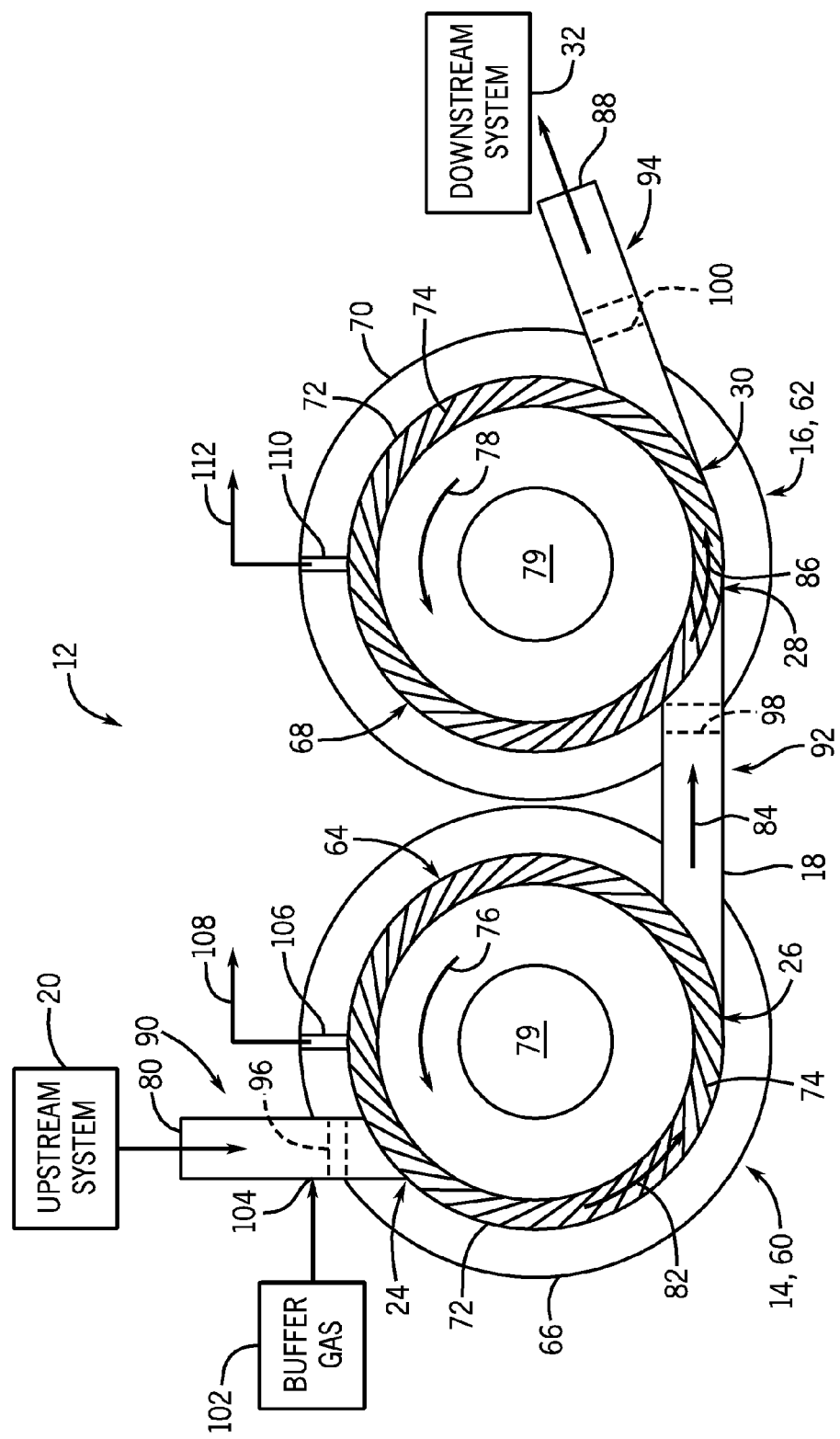
FIG. 2 is a cross-sectional side view of an embodiment of the multi-stage solids feeder of FIG. 1.

FIG. 2 is a cross-sectional side view of an embodiment of the multi-stage solids feeder 12 of FIG. 1. Each of the first and second solids feeders 14 and 16 may include a rotary mechanism disposed in a chamber and used to move the solids flow 22 from an inlet to an outlet of the feeder. In some embodiments, the rotary mechanism may include a rotor that directly moves the solid particles from the inlet to the outlet of the solids feeder. In other embodiments, the rotary mechanism may include a conveyor belt that is disposed about one or more rotors. As the rotors of the conveyor belt rotate, the conveyor moves the solid particles through the solids feeder, from the inlet to the outlet. The disclosed techniques may be applied using either of these configurations, or any type of solids feeder having a rotary mechanism disposed in a chamber for moving the solids flow 22. In either configuration, the solids flow 22 may be moved through the solids feeders 14 and 16 in a solids lockup condition, and the multi-stage solids feeder 12 may create one or more dynamic plugs upstream and/or downstream of the solids feeders 14 and 16.

In the illustrated embodiment, the first solids feeder 14 of the multi-stage solids feeder 12 is a first positive displacement pump 60. The second solids feeder 16 is a second positive displacement pump 62. One or both of the positive displacement pumps 60 and 62 may be a POSIMETRIC® Feeder made by General Electric Company of Schenectady, New York. As shown in FIG. 2, the first positive displacement pump 60 may include a first rotor 64 disposed in a first chamber 66 between the first inlet 24 and the first outlet 26. Similarly, the second positive displacement pump 62 may include a second rotor 68 disposed in a second chamber 70 between the second inlet 28 and the second outlet 30. Each of the first and second rotors 64 and 68 include two substantially opposed and parallel rotary discs 72, which may include discrete cavities defined by protrusions 74 to drive the solids flow 22 therebetween, creating a solids lockup condition, as described below. The rotary discs 72 of the first rotor 64 may be movable relative to the first chamber 66 in a rotational direction 76 from the first inlet 24 towards the first outlet 26. Likewise, the rotary discs 72 of the second rotor 68 may be movable relative to the second chamber 70 in a rotational direction 78 from the second inlet 28 to the second outlet 30. In the illustrated embodiment, the rotors 64 and 68 are configured to rotate in the same rotational directions 76 and 78. As discussed previously, the multi-stage solids feeder 12 is configured to substantially block gas flow through the multi-stage solids feeder 12 while enabling the solids flow 22 to move from the upstream system 20 to the downstream system 32.

As noted above, each of the first and second rotors 64 and 68 include two substantially opposed and parallel rotary discs 72, separated by a hub 79 and joined to a shaft that is common to the rotary discs 72 and the hub 79. In the first positive displacement pump 60, a convex surface of the hub 79, annular portions of both rotary disks 72 extending between the hub 79 and the outer circumference of the rotary discs 72, and an inner surface of the first chamber 66 define an annularly shaped, rotating channel that connects the first inlet 24 and the first outlet 26. A portion of the first chamber 66 disposed between the first inlet 24 and the first outlet 26 divides the rotating channel in such a way that solids entering the first inlet 24 may travel only in a direction of rotation 76 of the first rotor 64, so that the solids may be carried from the first inlet 24 to the first outlet 26 by means of the rotating channel.

As the solids flow 22 enters and moves through the first inlet 24, the solid particles progressively compact. As the solid particles continue to be drawn into the rotating channel, the compaction may reach a point where the particles become interlocked and form a bridge across the entire cross-section of the rotating channel. As the compacted particles continue to move through the rotating channel in the direction of rotation 76, the length of the zone containing particles which have formed an interlocking bridge across the entire cross-section of the rotating channel may become long enough that the force required to dislodge the bridged particles from the rotating channel exceeds the force that may be generated by the pressure the first outlet 26. This condition, where the interlocking solids within the rotating channel cannot be dislodged by the pressure at the first outlet 26, is called "lockup". By achieving the condition of lockup, the torque delivered by the shaft from the drive motor 42 may be transferred to the rotating solids so that the solids are driven from the first inlet 24 to the first outlet 26 against whatever pressure exists in the environment beyond the first outlet 26. In some embodiments, the rotary discs 72 may have raised or depressed surface features 74 formed onto their surfaces. These features 74 may enhance the ability of the particulate solids to achieve lockup in the rotating channel and, therefore, may enhance the ability of the drive shaft to transfer torque to the rotating solids. The components of the second positive displacement pump 62 operate in the same way to convey the solids flow 22 through an annular rotating channel of the second rotor 68 in a rotational direction 78.

Upon entering through an opening 80 of the first inlet 24, the solids flow 22 may travel in a direction 82 from the first inlet 24 to the first outlet 26. The solids flow 22 is moved through the first positive displacement pump 60 in the solids lockup condition as the rotary discs 72 rotate, and exits the first positive displacement pump 60 through the first outlet 26. From here, the solids flow 22 continues through the conduit 18 in a direction 84 from the first outlet 26 of the first positive displacement pump 60 to the second inlet 28 of the second positive displacement pump 62. As the solids flow 22 enters the second inlet 28, the solids flow 22 travels in a direction 86 from the second inlet 28 to the second outlet 30. The solids flow 22 is moved through the second positive displacement pump 62 in the solids lockup condition as the rotary discs 72 rotate, and exits the second positive displacement pump 62 through the second outlet 30. The solids flow 22 is finally fed through an opening 88 of the second outlet 30 to the downstream system 32.

The multi-stage solids feeder 12 is designed to feed the solids flow 22 from the upstream system 20 to the downstream system 32. The upstream system 20 may operate at a first atmosphere and the downstream system 32 may operate at a second atmosphere, where the first and second atmospheres have different pressures and/or different gas compositions. In order to feed the solids flow 22 from the upstream system 20 at the first atmosphere to the downstream system 32 at the second atmosphere, the multi-stage solids feeder 12 may allow the solids flow 22 while reducing a gas flow therethrough. To do so, the multi-stage solids feeder 12 may maintain at least one dynamic plug of the solids flow 22 through the multi-stage solids feeder 12. Such dynamic plugs, formed by the solids flow 22 locking up in the positive displacement pumps 60 and 62, may divide the multi-stage solids feeder 12 into components operating at different pressures. Such components may include a first seal duct 90 between the opening 80 and the first inlet 24, the first positive displacement pump 60, a second seal duct 92 (e.g., the conduit 18), the second positive displacement pump 62, and a third seal duct 94 between the second outlet 30 and the opening 88. Each of these components may operate at different pressures while feeding the solids flow 22 between the upstream and downstream systems 20 and 32.

The multi-stage solids feeder 12 having two solids feeders may create dynamic plugs of the solids flow 22 in as few as one and up to three of the seal ducts 90, 92, and 94. For example, the illustrated embodiment shows a first dynamic plug 96 in the first seal duct 90, a second dynamic plug 98 in the second seal duct 92, and a third dynamic plug 100 in the third seal duct 94. In the illustrated embodiment, the first, second, and third dynamic plugs 96, 98, and 100 are represented by dashed lines. The first dynamic plug 96 may be formed by a lockup of the solids flow 22 entering the first positive displacement pump 60. Since the solids flow 22 rotates through the first positive displacement pump 60 in a solids lockup condition, the solids flow 22 entering the first seal duct 90 may build up to form the first dynamic plug 96. The first dynamic plug 96 may allow the solids flow 22 to enter the first positive displacement pump 60 while blocking the flow of gas from the upstream system 20 into the first positive displacement pump 60. Maintaining the first dynamic plug 96 may allow the pressure in the first seal duct 90 (which is approximately the same as the pressure of the upstream system 20) to be different than the pressure in the first positive displacement pump 60. The multi-stage solids feeder 12 may be coupled to a buffer gas supply 102. The buffer gas supply 102 provides an inert buffer gas, such as nitrogen, into a flow path through the multi-stage solids feeder 12. In the illustrated embodiment, the buffer gas supply 102 provides the buffer gas to the first seal duct 90 through a gas inlet 104 located upstream of the first inlet 24. The buffer gas acts as an additional barrier to gases entering the first seal duct 90 from the upstream system 20 while allowing the solids flow 22 to pass. The buffer gas supply 102 may be especially useful for separating a solid/gas mixture output by the upstream system 20 into a gas and the solids flow 22. The gas may then be directed toward a different application (e.g., gas turbine engine) and the solids flow 22 may continue through the multi-stage solids feeder 12 toward the downstream system 32.

The multi-stage solids feeder 12 may create the second dynamic plug 98 of the solids flow 22 at the first outlet 26, the conduit 18, or the second inlet 28, or any combination thereof. The second dynamic plug 98 is formed by the solids flow 22 locking up as it enters the second positive displacement pump 62. As long as the second dynamic plug 98 is maintained within the second seal duct 92, the first and second positive displacement pumps 60 and 62 may operate at different pressures. It may be desirable for the solids feeders 14 and 16 to be located relatively near each other, so that the conduit 18 between the first outlet 26 and the second inlet 28 may be short enough to maintain the second dynamic plug 98. In some embodiments, the second seal duct 92 may be shaped such that the second dynamic plug 98 is maintained at a particular point in the conduit 18. In this way, the second dynamic plug 98 may be maintained in the middle of the conduit 18, toward the first outlet 26, or toward the second inlet 28, as illustrated. In addition, the multi-stage solids feeder 12 may be dimensioned such that the conduit 18 is not too long to maintain the lockup condition for forming the second dynamic plug 98.

The third dynamic plug 100 may be formed by a lockup of the solids flow 22 exiting the second positive displacement pump 62. In the illustrated embodiment, the third dynamic plug 100 is maintained passively since the third seal duct 94 has an upward slope. Other embodiments may include a valve or specially shaped third seal duct 94 to actively maintain the third dynamic plug 100. For example, there may be a turn in the third seal duct 94 for maintaining a plug of the solids flow 22 exiting the second positive displacement pump 62.

The multi-stage solids feeder 12 may create one or more of the dynamic plugs 96, 98, or 100. The dynamic plugs 96, 98, and 100 are configured to block gas flow using the solids flow 22, thereby enabling components of the multi-stage solids feeder 12 on either side of each dynamic plug to operate at different pressures. For example, the first dynamic plug 96 may separate gas at a first pressure in the first seal duct 90 from gas at a second pressure in the second seal duct 92. The first positive displacement pump 60 may operate at a pressure that is different from the first and/or second pressures. The first positive displacement pump 60 may include a vent 106 for removing gas 108 from the first positive displacement pump 60 and, consequently, reducing a first pump pressure.

Similarly, the third dynamic plug 100 may separate gas at the second pressure in the second seal duct 92 from gas at a third pressure in the third seal duct 94. The second positive displacement pump 62 may operate at a pressure that is different from the second and/or third pressures. The second positive displacement pump 62 may include a vent 110 for removing gas 112 from the second positive displacement pump 62 and, consequently, reducing a second pump pressure. It should be noted that vents throughout the multi-stage feeder 12, which may include the first and second vents 106 and 110, can help to remove any gas leakage between the upstream and downstream systems 20 and 32.

The controller 34 may control the first solid feed rate of the first solids feeder 14 and/or the second solid feed rate of the second solids feeder 16 to maintain the desired dynamic plugs within the multi-stage solids feeder 12. For example, the controller 34 may decrease the first solid feed rate of the first positive displacement pump 60 to maintain the first dynamic plug 96 in the first seal duct 90. It should be noted that the controller 34 decreases the second solid feed rate by the same amount, in order to keep the first and second positive displacement pumps 60 and 62 synchronized, thereby maintaining the second dynamic plug 98 and/or third dynamic plug 100. The controller 34 may respond to sensor feedback indicative of the first pressure upstream of the multi-stage solids feeder 12 (e.g., in the first seal duct 90) or a solid feed rate of the solids flow 22 entering the first seal duct 90. If the solid feed rate is not high enough to maintain effective lockup of the solids flow 22 at the first inlet 24, the controller 34 may operate the first positive displacement pump 60 at a lower solid feed rate to maintain the first dynamic plug 96. In addition, if the pressure measured in the first positive displacement pump 60 approaches the first pressure in the first seal duct 90, the controller 34 may operate the first positive displacement pump 60 at a lower solid feed rate to maintain the first dynamic plug 96. A low solid feed rate of the solids flow 22 entering the multi-stage solids feeder 12 may result in a loss of the first dynamic plug 96 until the controller 34 performs an appropriate adjustment of the first solid feed rate. In such instances, gas that leaks into the first positive displacement pump 60 from the first seal duct 90 may exit the pump through the vent 106. Any remaining gas in the first positive displacement pump 60 may be blocked by the second dynamic plug 98 and/or the third dynamic plug 100. Thus, the multiple solids feeders 14 and 16 in series may add redundancy to the blockage of gas flow through the multi-stage solids feeder 12, from the upstream system 20 to the downstream system 32 or vice versa.

It may be desirable for the controller 34 to operate the second solids feeder 16 at a lower solid feed rate than the first solids feeder 14 in order to maintain the second dynamic plug 98 between the two solids feeders 14 and 16. This operation of the solids feeders 14 and 16 at different feed rates would be performed just long enough for the solids feeders 14 and 16 to be resynchronized and the second dynamic plug 98 reestablished. In general, the second solids feeder 16 may act as a brake for the first solids feeder 14 in the event that the second dynamic plug 98 is lost, which could otherwise lead to loss of pressure containment. Maintaining the third dynamic plug 100 through proper shaping and/or orientation of the third seal duct 94 or through an active control mechanism (e.g., a valve) may block gases from flowing between the second positive displacement pump 62 and the downstream system 32, in either direction. This may be especially important in applications where the second positive displacement pump 62 operates at a lower pressure than the downstream system 32. Any undesirable gas that enters the second positive displacement pump through the second seal duct 92 or through the third seal duct 94 may exit the second positive displacement pump 62 through the vent 110.

The multi-stage solids feeder 12 may be used in different applications for feeding the solids flow 22 between upstream and downstream systems at different atmospheres, including pressure letdown operations. One such application includes the removal of dry char from a high pressure syngas atmosphere. In this type of operation, the solids flow 22 is a dry char that forms part of an untreated syngas output from the upstream system 20 (e.g., gasifier). The multi-stage solids feeder 12 may remove the dry char from the syngas so that the syngas can be further treated and used for power generation, chemical production, or another downstream process. The dry char is removed to ambient air, so the multi-stage solids feeder 12 uses dynamic seals to depressurize the incoming solids flow 22 (dry char) before outputting the solids flow 22 to the downstream system 32. In this application, the first dynamic plug 96 is operating passively in the inlet of the first seal duct 90, meaning that though the first dynamic plug 96 forms and the solids flow 22 locks up within the first positive displacement pump 60, there is no significant change in operating pressure across the first dynamic plug 96. Consequently, the first pressure in the first seal duct 90 and the pressure in the first positive displacement pump 60 may be approximately equal to the gasifier pressure of the upstream system 20. The second dynamic plug 98 is a pressure reducing plug in the second seal duct 92, meaning that the solids flow 22 forms a plug at the second inlet 28 across a pressure difference between the first and second positive displacement pumps 60 and 62 utilizing the lockup of the solids flow 22 within the second positive displacement pump 62. Consequently, the second dynamic plug 98 reduces the pressure of the solids flow 22 through the multi-stage solids feeder 12. The second positive displacement pump 62 may operate at a pressure between the operating pressures of the first positive displacement pump 60 and the downstream system 32, or at a pressure lower than the atmospheric pressure of the downstream system 32. The buffer gas supply 102 may introduce a nitrogen buffer gas upstream of the first dynamic plug 96 in the first seal duct 90. The buffer gas may provide an inert barrier between the syngas and the first positive displacement pump 60, helping to strip the solids flow 22 of the syngas as the solids flow 22 enters the first inlet 24. Any gas that leaks through the solids flow 22 into the first inlet 24 of the multi-stage solids feeder 12 may be removed through the vents 106 and 110. The second vent 110 may regulate the relatively lower pressure within the second positive displacement pump 62. Some embodiments of the multi-stage solids feeder 12 may maintain the third dynamic plug 100 for char removal applications, while others may not.

It should be noted that in other embodiments, the buffer gas supply 102 may be introduced at different positions of the multi-stage solids feeder 12. For example, the buffer gas supply 102 may be introduced into the second or third seal ducts 92 and 94 as well. Although only one is shown, there may be multiples buffer gas supplies 102 throughout the multi-stage solids feeder 12. Indeed, there may be one in each of the different seal ducts 90, 92, and 94 to reduce an amount of undesirable gas leaking between the upstream system 20, downstream system 32, and the solids feeders 14 and 16.

The multi-stage solids feeder 12 may also be useful in applications involving metering a solids flow 22 between two incompatible atmospheres, which may or may not be at different pressures. That is, the pressure of the upstream system 20 may be approximately the same, slightly higher, or slightly lower than the pressure of the downstream system 32. The multi-stage solids feeder 12 may operate similarly to the multi-stage solids feeder 12 used for depressurization, as described above. To block the flow of higher pressure gas from the downstream system 32 into the multi-stage solids feeder 12, the multi-stage solids feeder 12 may include an additional buffer gas supply coupled to the third seal duct 94 downstream of the third dynamic plug 100. In other embodiments, the multi-stage solids feeder 12 may maintain the first and third dynamic plugs 96 and 100 in the first and third seal ducts 90 and 94, respectively, without forming a second dynamic plug 98 in the second seal duct 92. In this case, the third seal duct 94 may be appropriately shaped (e.g., oriented upward, bent, or curved) or include an active control mechanism (e.g., valve) toward the opening 88 for maintaining the third dynamic plug 100.

The multi-stage solids feeder 12 also may be useful for continuous slag removal from a gasifier. In addition to syngas, the gasifier generates a slag mixture byproduct, which may be a wet ash material. It may be desirable for the multi-stage solids feeder 12 to feed the slag mixture from the upstream system 20 (e.g., a quench chamber of the gasifier) to the downstream system (e.g., a slag handling unit). The slag mixture may be a mixture of slag and water, the slag forming the solids flow 22. The solid/liquid slag mixture may flow through the multi-stage solids feeder 12, however, as long as the dynamic plugs and lockup condition of the solids flow 22 are maintained. The multi-stage solids feeder 12 may feed the solids flow 22 and the water of the slag mixture through the multi-stage solids feeder 12 without permitting gas flow through the multi-stage solids feeder 12. In some embodiments, the upstream system 20 may include a liquid removal section for removing the liquid water from the slag mixture before the slag enters the multi-stage solids feeder 12. The solids flow 22 may be pressurized as it exits the high pressure gasifier, and the downstream system 32 may include a slag handling unit or conveyor system that operates at ambient air conditions. Thus, the multi-stage solids feeder 12 may depressurize the solids flow 22 of the slag mixture as it flows through the multi-stage solids feeder 12. The pressure drop of the solids flow 22 may occur primarily across the second seal duct 92, or across a combination of the first, second, and third seal ducts 90, 92, and 94. Some embodiments may include a supply of flush water supplied to the solids flow 22 upstream of the first seal duct 90 in order to wash and cool the slag mixture as it exits the upstream system 20. A certain amount of dewatering of the slag mixture may occur as the solids flow 22 moves through the multi-stage solids feeder 12. Specifically, the multi-stage solids feeder 12 may be designed such that a desired amount of water is removed from the solids flow 22 through the vents 106 and 110 of the multi-stage solids feeder 12.

It should be noted that presently contemplated embodiments are not limited to use in the solid feeding applications described in detail above. The multi-stage solids feeder 12 may be used for any other operations where depressurization of a solids flow 22 is desired. The multi-stage solids feeder 12 also may be used for other operations related to conveying a solids flow 22 between two incompatible atmospheres.

Figure 3:
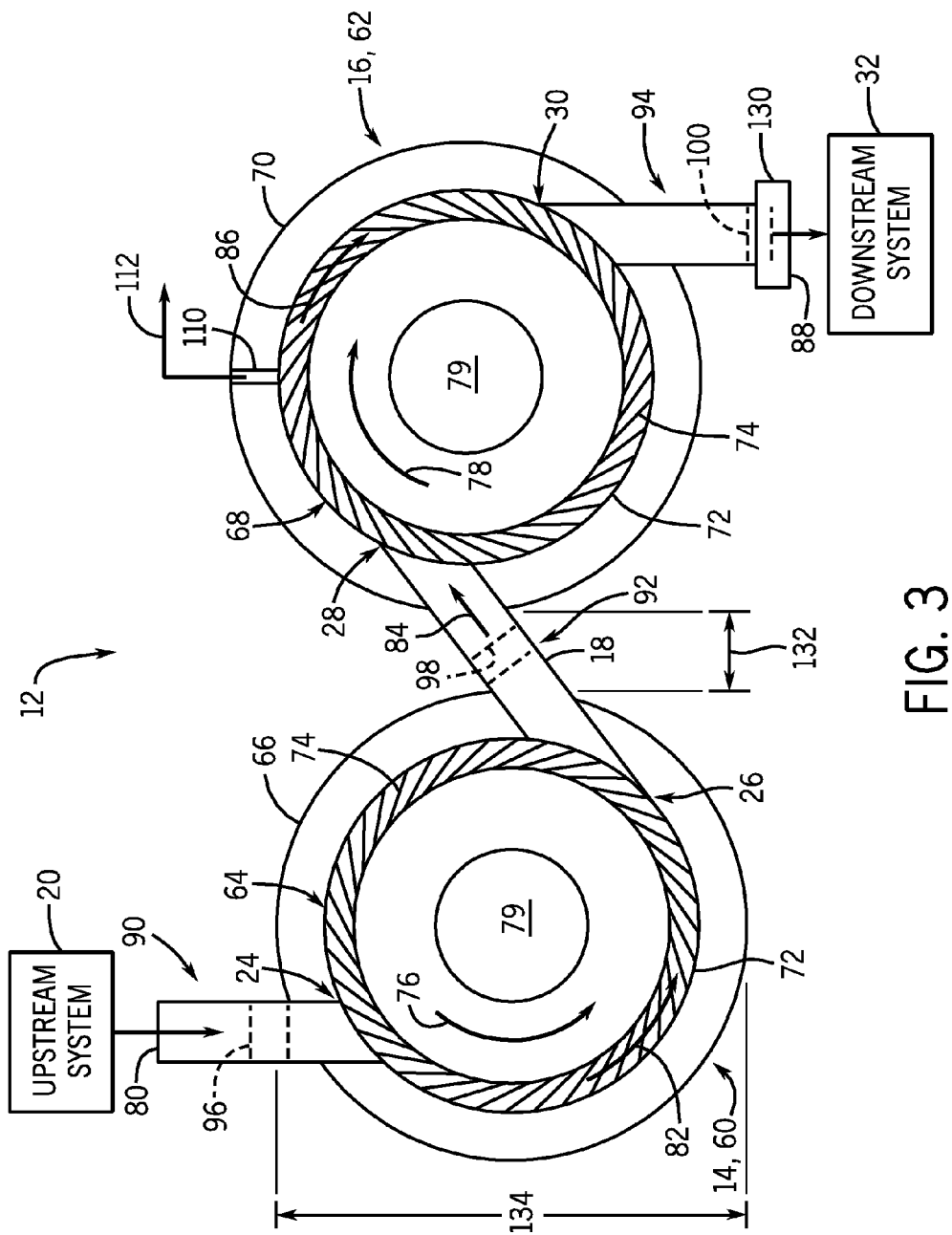
FIG. 3 is a cross-sectional side view of an embodiment of the multi-stage solids feeder of FIG. 1.

FIG. 3 is a cross-sectional side view of another embodiment of the multi-stage solids feeder 12 having two positive displacement pumps 60 and 62 in series. In this embodiment, the rotors 64 and 68 are configured to rotate in opposite rotational directions 76 and 78. The multi-stage solids feeder 12 includes the first, second, and third seal ducts 90, 92, and 94, where the solids flow 22 may lock up to maintain one or more of the dynamic plugs 96, 98, or 100. In the illustration, the second positive displacement pump 62 outputs the solids flow 22 in a downward direction toward the downstream system 32. In this configuration, the multi-stage solids feeder 12 includes a valve 130 that may be opened or closed to establish the third dynamic plug 100 downstream of the second outlet 30. In some embodiments, the valve 130 may be a solenoid valve, ball valve, gate valve, rotor valve, continuously variable valve, or the like, and may be continuously positioned between a fully open and fully closed position. The valve 130 may be controlled by electromechanical actuators, pneumatic actuators, hydraulic actuators, or other suitable controls. The controller 34 may actively control the position of the valve 130 to allow the solids flow 22 to pass through the third seal duct 94 while maintaining the third dynamic plug 100.

The controller 34 may independently control the first and second rotors 64 and 68. As a result, the multi-stage solids feeder 12 may provide a desired output of the solids flow 22 while maintaining a relatively constant load on the solids flow 22 moving through the second seal duct 92. The second rotor 68 effectively acts as a brake to maintain the second dynamic plug 98 while also moving the solids flow 22 toward the downstream system 32. For example, the controller 34 may adjust the second solid feed rate of the second solids feeder 16 for a desired output feed rate. Simultaneously, the controller 34 may adjust the first solid feed rate of the first solids feeder 14 to control a torque, load, a pressure drop, or volume of voids of the solids flow 22 in one or both of the solids feeders 14 and 16. The valve 130 may be operated to maintain a minimum force of the solids flow 22 exiting the multi-stage solids feeder 12, maintaining the third dynamic plug 100 of the solids flow 22.

It should be noted that the multi-stage solids feeder 12 includes at least the two solids feeders 14 and 16 coupled in series and located adjacent to one another. The solids feeders 14 and 16 are connected such that the solids flow 22 may continue from the first outlet 26 to the second inlet 28. As previously mentioned with respect to FIG. 2, it may be desirable for the solids feeders 14 and 16 to be located relatively near each other, so that the conduit 18 between the first outlet 26 and the second inlet 28 may be short enough to maintain the second dynamic plug 98. If the conduit 18 is too long, the solids flow 22 exiting the first solids feeder 14 may produce excessive torque, exceeding the capability for the solids flow 22 to lock up in the solids feeder 12 and maintain the second dynamic plug 98. To prevent this, the multi-stage solids feeder 12 may be properly dimensioned to maintain the desired second dynamic plug 98 based on expected feed rates, pressures, pump characteristics, and feeder applications (e.g., depressurization or metering). The multi-stage solids feeder 12 may include a minimum linear dimension 132 representative of the minimum linear distance between the first and second solids feeders 14 and 16. The multi-stage solids feeder 12 may have the solids feeders 14 and 16 spaced to maintain a desired ratio of the minimum linear dimension 132 to a maximum feeder dimension 134 (e.g., pump diameter) of the first and second solids feeders 14 and 16. The ratio of the minimum linear dimension 132 to the maximum feeder dimension 134 may be less than approximately 0.2, 0.4, 0.5, 0.8, or 1.0, within a desired range of approximately 0 to 1.0, 0.2 to 0.8, 0.4 to 0.75, or 0.3 to 0.5, or any ratio suitable to maintain the second dynamic plug 98. This way, the solids flow 22 may maintain a pressure between the first outlet 26 and the second inlet 28 for establishing and maintaining the second dynamic plug 98. In some embodiments, the multi-stage solids feeder 12 may be operated at such feed rates and under conditions where a conduit 18 is not desired and the first outlet 26 is immediately adjacent to the second inlet 28.

The multi-stage solids feeder 12 may be arranged and operated in different ways depending on desired operating parameters such as solid feed rates, solids feeder dimensions, pressure distributions, solids flow compositions, and control operations. If the first and second solids feeders 14 and 16 are positive displacement pumps 60 and 62, as illustrated, the positive displacement pumps 60 and 62 may be positioned at different orientations relative to each other. For example, the positive displacement pumps 60 and 62 may be positioned in a vertical orientation (e.g., the first positive displacement pump 60 above or below the second positive displacement pump 62). The positive displacement pumps 60 and 62 may have their respective inlets 24 and 28 and outlets 26 and 30 located in different circumferential positions relative to the rotors 64 and 68. This is shown in the different arrangements of FIGS. 2 and 3. In other embodiments, the seal ducts 90, 92, or 94 may be positioned at different relative angles between the first and second positive displacement pumps 60 and 62. Different alignments of the positive displacement pumps 60 and 62 and the conduit 18 can modify the seal ducts 90, 92, and 94 as well as the position within each seal duct where the solids lockup occurs. As previously discussed, the positive displacement pumps 60 and 62 may be rotated in the same direction (FIG. 2) or in opposite directions (FIG. 3). The positive displacement pumps 60 and 62 may be driven together or separately. In some embodiments, the rotors 64 and 68 may be geared together and driven by the same motor drive. Other embodiments may use two separate drives to enable independent control of the positive displacement pumps 60 and 62. Still other embodiments may use one drive to rotate both rotors 64 and 68, this drive being coupled with each rotor via an adjustable gear reduction, so that the controller 34 may control the feed rate of each positive displacement pump 60 and 62.

In some embodiments, the conduit 18 between the first and second solids feeders 14 and 16 may have an adjustable cross sectional area. This adjustable cross sectional area may allow different volumes of the solids flow 22 to pass through the second seal duct 92 at different times. The controller 34 may actively control the adjustable cross sectional area to maintain the desired dynamic plug 98 formed by the solids flow 22 between the two solids feeders 14 and 16. This may be especially useful when there is an inconsistent solid feed rate of the solids flow 22 entering the first solids feeder 14.

Technical effects of the invention include, among other things, the ability to depressurize or meter a solids flow between an upstream system and a downstream system. The upstream and downstream systems may operate at different atmospheres, e.g., at different pressures and/or gas compositions. The multi-stage solids feeder may create one or more dynamic plugs (e.g., 1, 2, 3, or more dynamic plugs) formed by the solids flow passing through the multi-stage solids feeder. The multi-stage solids feeder may include one or more buffer gas supplies to aid in establishing the dynamic plugs. These dynamic plugs may substantially block gas from flowing through the multi-stage solids feeder from the upstream and downstream systems, while allowing passage of the solids flow. Buffer gas introduced to the multi-stage solids feeder may reduce an amount of gas that leaks from one solids feeder to the other through the solids flow. The use of multiple solids feeders in series may add redundancy (e.g., multiple dynamic plugs) to the system, such that any gas that leaks past one dynamic plug into one of the solids feeders may be blocked by the next dynamic plug of the system and/or vented out of the solids feeder. The solids feeder may be positioned and controlled appropriately for the desired solid feeding application. A controller may actively control the solid feed rates of the different solids feeders to maintain the one or more dynamic plugs. The multi-stage solids feeder may allow more controlled metering of a solids flow between incompatible atmospheres. In addition, the multi-stage solids feeder enables controlled depressurization of a solids flow exiting a gasifier.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a multi-stage solids feeder, comprising:
a first solids feeder comprising a first inlet and a first outlet;
a second solids feeder comprising a second inlet and a second outlet, wherein the second solids feeder is disposed adjacent to the first solids feeder; and
a conduit disposed between the first outlet and the second inlet, wherein the conduit routes a solids flow from the first solids feeder to the second solids feeder, wherein the system comprises at least one of a plurality of features comprising:
the multi-stage solids feeder is configured to create a first dynamic plug of the solids flow at the first inlet, or a second dynamic plug of the solids flow in the conduit downstream of the first outlet or at the second inlet, or a third dynamic plug of the solids flow at the second outlet, or at least two dynamic plugs of the solids flow; or
the multi-stage solids feeder is configured to depressurize the solids flow from the first inlet to the second outlet; or
the multi-stage solids feeder is configured to maintain a third pressure between the first outlet and the second inlet that is less than both a first pressure at or upstream of the first inlet and a second pressure at or downstream of the second outlet; or
the multi-stage solids feeder is configured to receive a buffer gas; or
a controller configured to independently control a first solid feed rate of the first solids feeder and a second solid feed rate of the second solids feeder, or configured to control the first and second solids feeders to maintain at least one dynamic plug of the solids flow; or
a gasifier disposed upstream of the first inlet; or
the first and second solids feeders are spaced relative to each other such that a ratio between a minimum linear dimension from the first solids feeder to the second solids feeder and a maximum feeder dimension of the first and second solids feeders is less than approximately 0.5; or
the first and second solids feeders are configured to cooperatively create at least one intermediate dynamic plug; or
the first and second solids feeders are configured to operate at a common operational speed; or
any combination thereof.
2. The system of claim 1, wherein the multi-stage solids feeder is configured to create at least three dynamic plugs of the solids flow to substantially block gas flow while enabling the solids flow between an upstream system and a downstream system.

3. The system of claim 1, wherein the multi-stage solids feeder is configured to create the second dynamic plug of the solids flow in the conduit downstream of the first outlet or at the second inlet.

4. The system of claim 1, wherein the multi-stage solids feeder is configured to create the first dynamic plug of the solids flow at the first inlet.

5. The system of claim 1, wherein the first inlet of the first solids feeder is coupled to an upstream system having the first pressure, the second outlet of the second solids feeder is coupled to a downstream system having the second pressure, the first pressure is greater than the second pressure, and the multi-stage solids feeder is configured to depressurize the solids flow from the upstream system to the downstream system.

6. The system of claim 1, wherein the first inlet of the first solids feeder is coupled to an upstream system having the first pressure, the second outlet of the second solids feeder is coupled to a downstream system having the second pressure, and wherein the multi-stage solids feeder is configured to maintain the third pressure between the first outlet and the second inlet, wherein the third pressure is less than both the first pressure and the second pressure.

7. The system of claim 1, wherein the multi-stage solids feeder is coupled to at least one buffer gas supply that provides a flow of the buffer gas into a flow path through the multi-stage solids feeder.

8. The system of claim 1, comprising the controller configured to control the first solid feed rate of the first solids feeder and the second solid feed rate of the second solids feeder based on sensor feedback, wherein the controller is configured to independently control the first solid feed rate and the second solid feed rate.

9. The system of claim 8, wherein the sensor feedback comprises data indicative of at least one of the first pressure upstream of the multi-stage solids feeder, the third pressure between the first and second solids feeders, the second pressure downstream of the multi-stage solids feeder, or a solid feed rate.

10. The system of claim 1, comprising the gasifier coupled to the first inlet of the multi-stage solids feeder.

11. The system of claim 1, comprising the controller configured to control the first and second solids feeders to maintain the at least one dynamic plug at the first inlet, or between the first and second feeders, or both.

12. The system of claim 1, wherein the first and second solids feeders are spaced relative to each other such that the ratio between the minimum linear dimension from the first solids feeder to the second solids feeder and the maximum feeder dimension of the first and second solids feeders is less than approximately 0.5.

13. The system of claim 1, wherein the multi-stage solids feeder is configured to create the at least two dynamic plugs of the solids flow.

14. The system of claim 1, wherein the multi-stage solids feeder is configured to create the third dynamic plug of the solids flow at the second outlet.

15. The system of claim 1, wherein the first and second solids feeders are configured to cooperatively create the at least one intermediate dynamic plug.

16. A system, comprising:
a multi-stage solids feeder, comprising:
 a first solids feeder comprising a first rotary mechanism disposed in a first chamber between a first inlet and a first outlet; and
 a second solids feeder comprising a second rotary mechanism disposed in a second chamber between a second inlet and a second outlet, wherein the first and second solids feeders are disposed adjacent one another, the first outlet is coupled to the second inlet, and the multi-stage solids feeder is configured to substantially block gas flow while enabling a solids flow, wherein the system comprises at least one of a plurality of features comprising:
the multi-stage solids feeder is configured to create a first dynamic plug of the solids flow at the first inlet, or a second dynamic plug of the solids flow in a conduit downstream of the first outlet or at the second inlet, or a third dynamic plug of the solids flow at the second outlet, or at least two dynamic plugs of the solids flow; or
the multi-stage solids feeder is configured to depressurize the solids flow from the first inlet to the second outlet; or
the multi-stage solids feeder is configured to maintain a third pressure between the first outlet and the second inlet that is less than both a first pressure at or upstream of the first inlet and a second pressure at or downstream of the second outlet; or
the multi-stage solids feeder is configured to receive a buffer gas; or
a controller configured to independently control a first solid feed rate of the first solids feeder and a second solid feed rate of the second solids feeder, or configured to control the first and second solids feeders to maintain at least one dynamic plug of the solids flow; or
a gasifier disposed upstream of the first inlet; or
the first and second solids feeders are spaced relative to each other such that a ratio between a minimum linear dimension from the first solids feeder to the second solids feeder and a maximum feeder dimension of the first and second solids feeders is less than approximately 0.5; or
the first and second solids feeders are configured to cooperatively create at least one intermediate dynamic plug; or
the first and second solids feeders are configured to operate at a common operational speed; or
any combination thereof.

17. The system of claim 16, comprising the conduit disposed between the first outlet and the second inlet, and the multi-stage solids feeder is configured to create the second dynamic plug of the solids flow in the conduit downstream of the first outlet or at the second inlet.

18. The system of claim 16, wherein the multi-stage solids feeder is configured to create the first dynamic plug of the solids flow at the first inlet to substantially block the gas flow while enabling the solids flow between an upstream system and a downstream system.

19. The system of claim 16, wherein the multi-stage solids feeder is configured to create the first dynamic plug of the solids flow at the first inlet; the second dynamic plug at the first outlet, the second inlet, or the conduit between the first outlet and the second inlet; and the third dynamic plug of the solids flow at the second outlet.

20. The system of claim 16, wherein the multi-stage solids feeder is coupled to at least one inert buffer gas supply configured to supply the buffer gas into a flow path through the multi-stage solids feeder.

21. The system of claim 16, wherein the first outlet is directly coupled to the second inlet.

22. The system of claim 16, wherein the system comprises at least two of the plurality of features.

23. The system of claim 16, wherein the system comprises at least three of the plurality of features.

24. The system of claim 16, wherein the system comprises at least four of the plurality of features.

25. The system of claim 16, wherein the multi-stage solids feeder is configured to create the at least two dynamic plugs of the solids flow.

26. The system of claim 16, wherein the multi-stage solids feeder is configured to depressurize the solids flow from the first inlet to the second outlet, the multi-stage solids feeder is fluidly coupled to the gasifier upstream of the first inlet, or a combination thereof.

27. The system of claim 16, comprising the controller configured to independently control the first solid feed rate of the first solids feeder and the second solid feed rate of the second solids feeder, or configured to control the first and second solids feeders to maintain the at least one dynamic plug of the solids flow, or a combination thereof.

28. A method, comprising:
    feeding a solids flow through a first solids feeder from a first inlet, along a first rotary mechanism within a first chamber, and out through a first outlet;
    feeding the solids flow from the first outlet through a second solids feeder from a second inlet, along a second rotary mechanism within a second chamber, and out through a second outlet, wherein the first and second solids feeders are disposed adjacent one another as a multi-stage solids feeder; and
    creating at least one dynamic plug of the solids flow in the multi-stage solids feeder to substantially block gas flow while enabling the solids flow through the multi-stage solids feeder, wherein the method comprises at least one of:
    creating a first dynamic plug of the solids flow at the first inlet, or a second dynamic plug of the solids flow in a conduit downstream of the first outlet or at the second inlet, or a third dynamic plug of the solids flow at the second outlet, or at least two dynamic plugs of the solids flow; or
    depressurizing the solids flow from the first inlet to the second outlet; or
    independently controlling a first solid feed rate of the first solids feeder and a second solid feed rate of the second solids feeder; or
    controlling the first and second solids feeders to maintain the at least one dynamic plug of the solids flow; or
    receiving the solids flow into the first inlet from a gasifier disposed upstream of the multi-stage solids feeder; or
    any combination thereof.

29. The method of claim 28, wherein creating the at least one dynamic plug comprises creating the first dynamic plug of the solids flow at the first inlet; the second dynamic plug at the first outlet, the second inlet, or the conduit between the first outlet and the second inlet; and the third dynamic plug of the solids flow at the second outlet.

30. The method of claim 28, comprising supplying at least one inert buffer gas into the multi-stage solids feeder.

31. The method of claim 28, comprising controlling the first and second solids feeders to maintain the at least one dynamic plug of the solids flow in the conduit between the first and second solids feeders.

* * * * *